US009690711B2

(12) United States Patent
Callaway et al.

(10) Patent No.: US 9,690,711 B2
(45) Date of Patent: Jun. 27, 2017

(54) SCHEDULER TRAINING FOR MULTI-MODULE BYTE CACHING

(71) Applicant: International Business Machines Corporation, Armonk, NY (US)

(72) Inventors: Robert D. Callaway, Holly Springs, NC (US); Ioannis Papapanagiotou, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 263 days.

(21) Appl. No.: 14/477,093

(22) Filed: Sep. 4, 2014

(65) Prior Publication Data
US 2014/0372708 A1    Dec. 18, 2014

Related U.S. Application Data

(63) Continuation-in-part of application No. 14/059,959, filed on Oct. 22, 2013, now Pat. No. 9,298,638, which
(Continued)

(51) Int. Cl.
G06F 12/08       (2016.01)
G06F 12/0891     (2016.01)
(Continued)

(52) U.S. Cl.
CPC ...... *G06F 12/0891* (2013.01); *G06F 12/0871* (2013.01); *G06F 3/0608* (2013.01);
(Continued)

(58) Field of Classification Search
USPC .......................................... 711/135
See application file for complete search history.

(56) References Cited

U.S. PATENT DOCUMENTS 8,086,799 B2 * 12/2011 Mondal ................ G06F 3/0608
                                                    711/116
9,104,582 B1 *  8/2015 Mukundan .......... G06F 12/0893
(Continued)

FOREIGN PATENT DOCUMENTS

CN    102195877 A    9/2011
CN    102546817 A    7/2012

OTHER PUBLICATIONS

Papapanagiotou et al., "Chunk and Object Level Deduplication for Web Optimization: A Hybrid Approach", International Communications Conference (ICC), 2012 IEEE, Jun. 2012.

*Primary Examiner* — Pierre-Michel Bataille
*Assistant Examiner* — Matthew Chrzanowski
(74) *Attorney, Agent, or Firm* — Steven M. Greenberg, Esq.; CRGO Law

(57) ABSTRACT

Embodiments of the present invention provide a method, system and computer program product for dynamic caching module selection for optimized data deduplication. In an embodiment of the invention, a method for dynamic caching module selection for optimized data deduplication is provided. The method includes processing historically relevant byte streams in each of a multiplicity of byte caching modules to populate a table of associations between different classifications of the historically relevant byte streams and correspondingly optimal ones of the multiplicity of the byte caching modules. The method also includes receiving a request to retrieve data from a data source and classifying the request. The method yet further includes consulting the table to identify, from amongst the multiplicity of byte caching modules, a particular byte caching module associated with the classification of the request. Finally, the method includes deduplicating the data in the identified byte caching module.

18 Claims, 2 Drawing Sheets

Related U.S. Application Data is a continuation of application No. 13/800,289, filed on Mar. 13, 2013, now Pat. No. 9,298,637.

(51) Int. Cl.
*G06F 12/0871* (2016.01)
*G06F 3/06* (2006.01)
*G06F 3/16* (2006.01)

(52) U.S. Cl.
CPC ............ *G06F 3/0641* (2013.01); *G06F 3/167* (2013.01); *G06F 2212/264* (2013.01); *G06F 2212/283* (2013.01)

(56) References Cited

U.S. PATENT DOCUMENTS

| | | | |
|---|---|---|---|
| 2009/0182789 A1* | 7/2009 | Sandorfi | G06F 11/1004 |
| 2011/0307447 A1* | 12/2011 | Sabaa | H04L 67/2842 |
| | | | 707/637 |
| 2011/0307659 A1* | 12/2011 | Hans | G06F 3/0613 |
| | | | 711/114 |
| 2012/0047328 A1 | 2/2012 | Williams et al. | |
| 2013/0086006 A1* | 4/2013 | Colgrove | G06F 3/0688 |
| | | | 707/692 |
| 2013/0318051 A1* | 11/2013 | Kumar | G06F 17/30156 |
| | | | 707/692 |
| 2013/0339643 A1* | 12/2013 | Tekade | G06F 17/30581 |
| | | | 711/162 |
| 2014/0115182 A1* | 4/2014 | Sabaa | H04L 67/1097 |
| | | | 709/232 |
| 2014/0201442 A1* | 7/2014 | Rajasekaran | G06F 12/0871 |
| | | | 711/119 |
| 2014/0281262 A1* | 9/2014 | Callaway | G06F 12/0891 |
| | | | 711/135 |
| 2016/0077926 A1* | 3/2016 | Mutalik | G06F 11/1456 |
| | | | 711/162 |

\* cited by examiner

SCHEDULER TRAINING FOR MULTI-MODULE BYTE CACHING

CROSS-REFERENCE TO RELATED APPLICATIONS

This application is a Continuation-in-Part of U.S. application Ser. No. 14/059,959, filed Oct. 22, 2013, currently pending, which is a continuation of U.S. application Ser. No. 13/800,289, filed Mar. 13, 2013, currently pending, the entirety of which is incorporated herein by reference.

BACKGROUND OF THE INVENTION

Field of the Invention

The present invention relates to data deduplication and more particularly to data deduplication through byte caching.

Description of the Related Art

Data deduplication refers to the reduction of a data flow through the elimination of redundancies in data. The act of data deduplication can reduce the quantity of traffic transmitted across a communications channel thereby increasing the responsiveness of communications between network entities exchanging data over the communications channel. Data deduplication can be performed technically in several different ways including data compression, delta encoding, proxy caching and data redundancy elimination.

Data compression removes redundant content on a per-object basis by representing duplicate bytes with hash values. In delta encoding, a technique applicable only to Web based objects, similar portions of a Web object can be represented with a hash value. Proxy caching, like data compression and delta encoding, is an object based method that performs object level deduplication by storing an object that may potentially be referenced later. Data redundancy elimination, also referred to as byte caching, differs from data compression, delta encoding and proxy caching in that byte caching operates at the byte level and is not limited only to Web objects and the hypertext transfer protocol (HTTP).

In byte caching, a combination of an encoder and decoder act in concert over a sideband channel to identify within the encoder regions of repeated bytes within byte streams and to replace these regions with hash values only to be reconstituted as a full byte stream at the decoder. The precision afforded by byte caching can provide the most effective form of deduplication, but not without substantial computational and resource cost.

Specifically, the use of byte caching as middleware in a data processing system can result in undesirable excessive memory utilization, and overutilization of processing cycles creating a bottleneck of throughput at the point of byte caching. Further, to the extent that byte caching relies upon proper fingerprint size selection which can vary in effectiveness for data from different application sources, the utilization of byte caching for data flows of different applications can be effective only for some applications and not others. Finally, much of the effectiveness of byte caching is mitigated through the inefficiency of byte caching upon byte streams lacking redundancy such as encrypted byte streams.

BRIEF SUMMARY OF THE INVENTION

Embodiments of the present invention address deficiencies of the art in respect to byte caching for data deduplication and provide a novel and non-obvious method, system and computer program product for dynamic caching module selection for optimized data deduplication. In an embodiment of the invention, a method for dynamic caching module selection for optimized data deduplication is provided. The method includes processing historically relevant byte streams in each of a multiplicity of byte caching modules to populate a table of associations between different classifications of the historically relevant byte streams and correspondingly optimal ones of the multiplicity of the byte caching modules. The method also includes receiving a request to retrieve data from a data source and classifying the request. The method yet further includes consulting the table to identify, from amongst the multiplicity of byte caching modules, a particular byte caching module associated with the classification of the request. Finally, the method includes deduplicating the data in the identified byte caching module.

In one aspect of the embodiment, it can be determined that an entry does not exist in the table for the classified request. In consequence, the request can be dynamically classified according to a statistical classification such as a naïve Bayesian classifier. Thereafter, it can be determined from the table a particular one of the byte caching modules associated with the dynamic classification. As such, the data can be deduplicated in the particular one of the byte caching modules.

In another aspect of the embodiment, the method can additionally include updating the table with an indication of the identification of the particular byte caching module associated with the classification of the request. Further, an entry can be added to the table associating the dynamically classified byte stream with the particular one of the byte caching modules. Even yet further, a fixed amount of memory can be statically allocated to accommodate the table in memory, yet subsequently, it can be determined that not enough memory remains in the fixed amount of memory to accommodate the entry to be added to the table. Consequently, in response to the determination, an entry in the table can be evicted to accommodate the entry to be added to the table.

In another embodiment of the invention, a data deduplication data processing system is configured for dynamic caching module selection for optimized data deduplication. The system includes a server communicatively coupled to a data store and one or more client computers over a computer communications network. The system also includes middleware disposed between the server and the client computers and executing in memory of a host computer. The middleware includes a multiplicity of byte caching modules, each byte caching module having a different configuration. The system yet further includes a scheduler that includes program code executing in memory of a host computer and enabled to classify a request to retrieve data from the data store of the server, to identify, in a table, from amongst the different byte caching modules a particular byte caching module associated with the classification of the request, and to route the data for deduplication in the identified byte caching module. Finally, the system includes a trainer that includes program code executing in the memory of the host computer and enabled to process historically relevant byte streams in each of the different byte caching modules to populate a table of associations between different classifications of the historically relevant byte streams and correspondingly optimal ones of the byte caching modules.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for scheduler training in dynamic caching module selection for optimized data deduplication. In accordance with an embodiment of the invention, a table can be established correlating different data flows to different byte caching modules so that an optimal one of the byte caching modules is associated with each of the data flows. The table can be populated with the associations between classifications of data flows and optimal byte caching modules initially by processing during a training phase and exemplary number of historically relevant data flows in all of the byte caching modules. The performance of each of the byte caching modules can be measured and an optimally performing one of the byte caching modules for each of the data flows can be recorded in the table for a corresponding one of the data flows. Thereafter, the training mode can terminate and an operational mode can commence.

In the operational mode, an inbound byte stream can be classified and compared to the table. To the extent that an associated byte caching module can be identified for a classification of the inbound byte stream, the inbound byte stream can be routed for deduplication in the associated byte stream cache module. Otherwise, a best matching one of the byte caching modules can be selected dynamically according to a statistical classifier. Thereafter, an entry can be added to the table associating a classification of the inbound byte stream with the dynamically selected byte caching module. Of note, the table can be disposed in a statically allocated portion of memory. As such, to the extent that no space remains in the statically allocated portion of memory, an entry in the table can be evicted, for instance the least recently used or least frequently used entry in the table.

Figure 1:
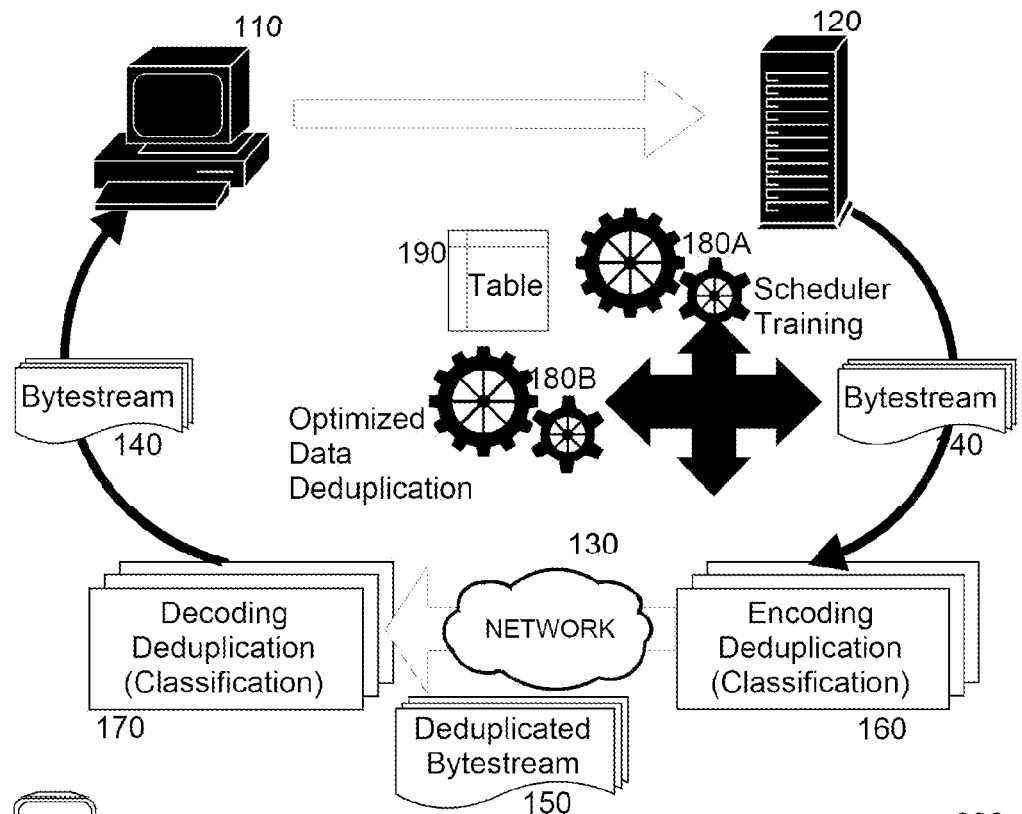
FIG. 1 is a pictorial illustration of a process for dynamic caching module selection for optimized data deduplication.

In further illustration, FIG. 1 pictorially shows a process for scheduler training in dynamic caching module selection for optimized data deduplication. As shown in FIG. 1, a table 190 is established associating different byte streams with several differently configured encoding deduplication modules 160. The table 190 is initially populated by scheduler training logic 180A by providing historically relevant byte streams to each of the modules 160 and by monitoring resource utilization and performance of each of the modules 160 in consequence of processing the byte streams. For each of the byte streams, the scheduler training logic 180A can write an entry to the table 190 associating a classification of the byte stream with a correspondingly optimal one of the modules 160. Thereafter, optimized data deduplication logic 180B can process a dynamically received byte stream 140 through an assignment of one of the modules 160 based upon the table 190.

In this regard, a data source 120 can respond to a data request from client 110 over network 130 by locating a requested byte stream 140. Optimized data deduplication logic 180 can classify the byte stream 140, for example in terms of a consuming application in the client 110, an address of the consuming application in the client 110, and a port in the client 110 through which the consuming application is accessed. Thereafter, the optimized data deduplication logic 180 can consult with the table 190 to select a particular one of the encoding deduplication modules 160 associated with the classification to perform byte caching on the byte stream 140. The resulting byte caching can generate a deduplicated byte stream 150 that is provided over a sideband channel to a corresponding one of several differently configured decoding deduplication modules 170. Finally, the corresponding one of the decoding deduplication modules 170 can act upon the deduplicated byte stream 150 to regenerate the byte stream 140 for delivery to the client 110.

Figure 2:
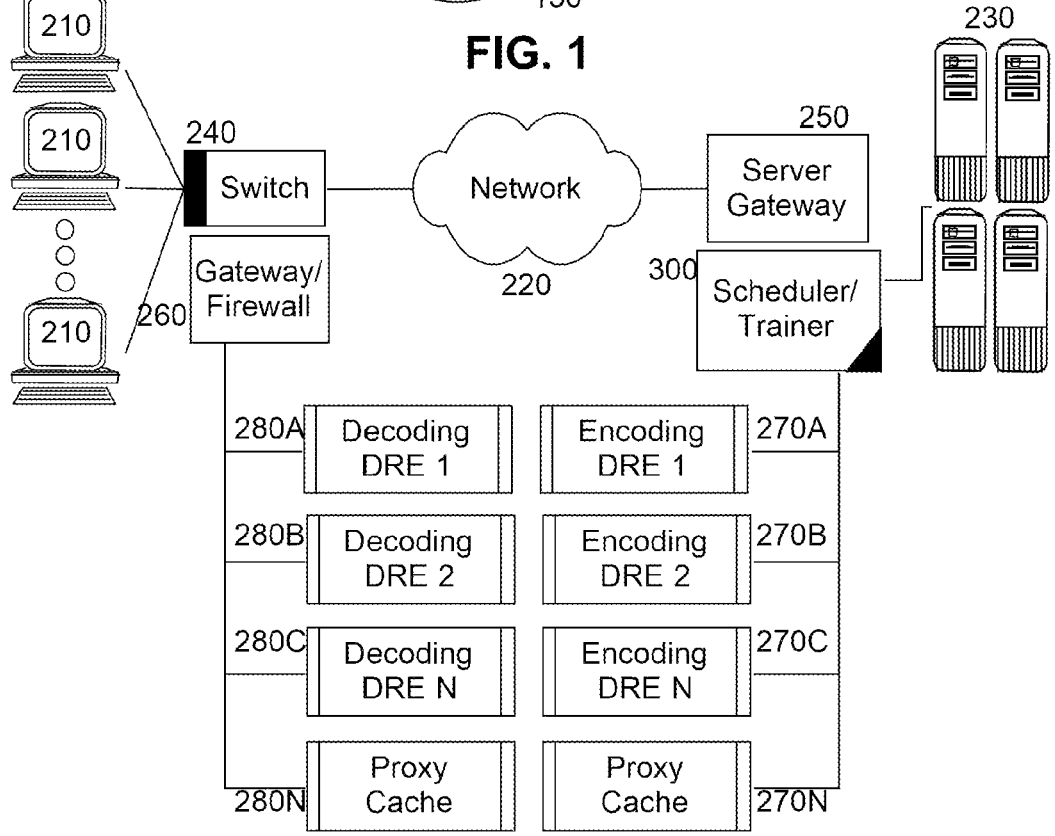
FIG. 2 is a schematic illustration of a data deduplication data processing system configured for scheduler training in dynamic caching module selection for optimized data deduplication; and, FIG. 3 is a flow chart illustrating a process for training a caching module scheduler for use in dynamic caching module selection for optimized data deduplication.

The process described in connection with FIG. 1 can be implemented within a data deduplication data processing system. In yet further illustration, FIG. 2 schematically shows a data deduplication data processing system configured for scheduler training in dynamic caching module selection for optimized data deduplication. The system can include a server farm 230 including data storage that manages the storage and retrieval of data from data storage across one or more server computers and communicatively coupled to data consuming clients 210 by way of a computer communications network 220 through a server gateway 250. Of note, optimized data deduplication middleware can be disposed between the server farm 230 and the clients 210.

The middleware can include multiple different encoding caching modules 270A, 270B, 270C each executing in the memory of a host computer and communicatively linked to corresponding decoding caching modules 280A, 280B, 280C. The middleware also can include a proxy cache 270N, 280N configured to act upon Web objects. Finally, each pair of the encoding and decoding caching modules 270A, 280A, 270B, 280B, 270C, 280C can be a byte cache configured differently according to different fingerprint sizes. Each of the encoding caching modules 270A, 270B, 270C can share the same memory space. Of import, a scheduler/trainer 300 can execute in memory of a host computer coupled to the server gateway 250.

The scheduler/trainer 300 can include program code enabled to classify a request for data in the server farm 230 by an application in one of the clients 210. In scheduler mode, the scheduler 300 can select one of the encoding caching modules 270A, 270B, 270C to perform data deduplication (or the proxy cache 270N, 280N) based upon the classification of the request for data by consulting a table correlating different classifications with different ones of the encoding caching modules 270A, 270B, 270C. The classification can include, for example, an identity of an application associated with the request, a network address of the application, a port for communicating with the application, or any combination thereof.

The table itself can be constructed by the program code of the scheduler/trainer 300 according to training data submitted to each of the encoding caching modules 270A, 270B, 270C from different servers according to different protocols. The performance metrics of each of the encoding caching modules 270A, 270B, 270C can be monitored and measured, for example, for throughput, processor and memory utilization and response time, to name only a few examples. The measured metrics can be submitted to a performance function, for example a function that weights different metrics for the utilization of different resources and then sums the weighted outcomes into an aggregated metric. The aggregate metric for a particular training data set can be compared against other aggregate metrics for the same training data set in different ones of the encoding caching modules 270A, 270B, 270C. In this way, the table can be constructed with an optimal one of the encoding caching modules 270A, 270B, 270C corresponding to a classification for the training data. Optionally, the performance of the encoding caching modules 270A, 270B, 270C can be monitored and fed back to the scheduler 300 so that the table can be adapted according to the monitored performance of the encoding caching modules 270A, 270B, 270C.

Once the scheduler/trainer 300 has selected a particular one of the encoding caching modules 270A, 270B, 270C, a byte stream of requested data by an application in a requesting one of the clients 210 can be deduplicated by the selected one of the encoding caching modules 270A, 270B, 270C and transmitted over a sideband channel to a corresponding one of the decoding caching modules 280A, 280B, 280C. The corresponding one of the decoding caching modules 280A, 280B, 280C can reconstitute the deduplicated byte stream and can transmit the reconstituted byte stream to the requesting application through gateway/firewall 260 by way of switch 240.

Figure 3:
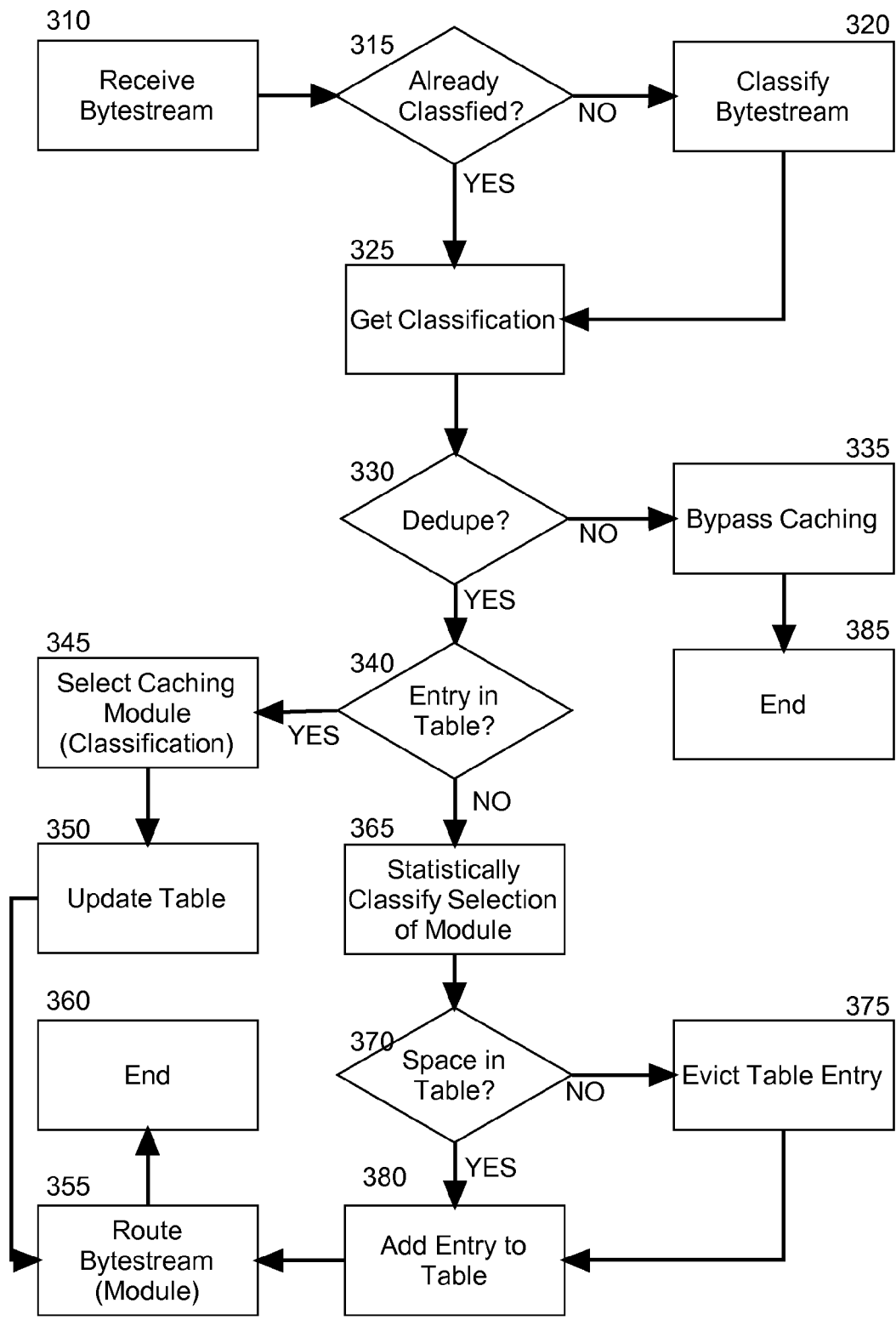

In even yet further illustration of the operation of the scheduler/trainer 300, FIG. 3 is a flow chart illustrating a process for training a caching module scheduler for use in dynamic caching module selection for optimized data deduplication. Beginning in block 310, a byte stream can be received from a server farm for delivery to a requesting application over a computer communications network. In decision block 315, it can be determined whether or not the requested byte stream already had been classified by the scheduler. If not, in block 320 the byte stream can be classified in accordance with a protocol utilized to transmit the request, a server address of a server transmitting the address and a port of the server associated with a requesting application. Thereafter, the classification can be returned to the scheduler in block 325.

In decision block 330, it can be determined whether or not the byte stream is to be deduplicated. In this regard, if the classification indicates that the protocol of the request does not lend itself to efficient deduplication, in block 355, caching can be bypassed and the process can end in block 385. Otherwise, in decision block 340, it can be determined if an entry can be found in a module selection table for the classification. If so, in block 345 a particular caching module can be selected according to the entry in the table and in block 350, the table can be updated to indicate the selection of the module based upon the classification. Thereafter, in block 355, the byte stream can be routed to the selected caching module and the process can end in block 360.

In decision block 340, however, if an entry cannot be found in the table for the classification, in block 365 a module can be selected based upon a statistical classification of the bytestream relative to classifications of bytestreams already associated with modules in the table. By way of example, a naïve Bayesian analysis can be performed against the classification of the received byte stream and the existing classifications to best select a module. Subsequently, in block 370 it can be determined if space remains in the table to accommodate a new entry. If not, in block 375 a least recently used or least frequently used entry can be evicted from the table. Finally, in block 380 a new entry can be added to the table associating the classification of the received bytestream with the selected module. Finally, in block 355, the byte stream can be routed to the selected caching module and the process can end in block 360.

The present invention may be embodied within a system, a method, a computer program product or any combination thereof. The computer program product may include a computer readable storage medium or media having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

We claim:

1. A method for dynamic caching module selection for optimized data deduplication, the method comprising:
   processing historically relevant byte streams in each of a multiplicity of byte caching modules to populate a table of associations between different classifications of the historically relevant byte streams and correspondingly optimal ones of the multiplicity of the byte caching modules;
   receiving a request to retrieve data from a data source;
   classifying the request;
   consulting the table to identify, from amongst the multiplicity of byte caching modules, a particular byte caching module associated with the classification of the request; and,
   deduplicating the data in the identified byte caching module.

2. The method of claim 1, further comprising:
   determining that an entry does not exist in the table for the classified request;
   dynamically classifying the request according to a statistical classification;
   determining from the table a particular one of the byte caching modules associated with the dynamic classification; and,
   deduplicating the data in the particular one of the byte caching modules.

3. The method of claim 2, wherein the statistical classification is a naïve Bayesian classifier.

4. The method of claim 1, further comprising updating the table with an indication of the identification of the particular byte caching module associated with the classification of the request.

5. The method of claim 2, further comprising dynamically allocating additional memory to accommodate the table and adding an entry to the table associating the dynamically classified byte stream with the particular one of the byte caching modules.

6. The method of claim 5, further comprising:
statically allocating a fixed amount of memory to accommodate the table in memory;
determining that not enough memory remains in the fixed amount of memory to accommodate the entry to be added to the table; and,
responsive to the determination, evicting an entry in the table to accommodate the entry to be added to the table.

7. A data deduplication data processing system configured for dynamic caching module selection for optimized data deduplication, the system comprising:
a server communicatively coupled to a data store and plurality of client computers over a computer communications network;
middleware disposed between the server and the client computers and executing in memory of a host computer, the middleware comprising a multiplicity of byte caching modules, each byte caching module having a different configuration;
a scheduler comprising program code executing in memory of a host computer and enabled to classify a request to retrieve data from the data store of the server, to identify, in a table, from amongst the different byte caching modules a particular byte caching module associated with the classification of the request, and to route the data for deduplication in the identified byte caching module; and,
a trainer comprising program code executing in the memory of the host computer and enabled to process historically relevant byte streams in each of the different byte caching modules to populate a table of associations between different classifications of the historically relevant byte streams and correspondingly optimal ones of the byte caching modules.

8. The system of claim 7, wherein the program code of the scheduler determines that an entry does not exist in the table for the classified request, dynamically classifies the request according to a statistical classification and determines from the table a particular one of the byte caching modules associated with the dynamic classification and deduplicates the data in the particular one of the byte caching modules.

9. The system of claim 8, wherein the statistical classification is a naïve Bayesian classifier.

10. The system of claim 7, wherein the program code of the scheduler updates the table with an indication of the identification of the particular byte caching module associated with the classification of the request.

11. The system of claim 8, wherein the program code of the scheduler dynamically allocates additional memory to accommodate the table and adds an entry to the table associating the dynamically classified byte stream with the particular one of the byte caching modules.

12. The system of claim 11, wherein the program code of the scheduler statically allocates a fixed amount of memory to accommodate the table in memory, determines that not enough memory remains in the fixed amount of memory to accommodate the entry to be added to the table and, in response to the determination, evicts an entry in the table to accommodate the entry to be added to the table.

13. A computer program product for dynamic caching module selection for optimized data deduplication, the computer program product comprising a non-transitory computer readable storage medium having program instructions embodied therewith, the program instructions executable by a device to cause the device to perform a method comprising:
processing, by the device, historically relevant byte streams in each of a multiplicity of byte caching modules to populate a table of associations between different classifications of the historically relevant byte streams and correspondingly optimal ones of the multiplicity of the byte caching modules;
receiving, by the device, a request to retrieve data from a data source;
classifying, by the device, the request;
consulting the table, by the device, to identify, from amongst the multiplicity of byte caching modules, a particular byte caching module associated with the classification of the request; and,
deduplicating the data, by the device, in the identified byte caching module.

14. The computer program product of claim 13, further comprising:
determining, by the device, that an entry does not exist in the table for the classified request;
dynamically classifying the request, by the device, according to a statistical classification;
determining, by the device, from the table a particular one of the byte caching modules associated with the dynamic classification; and,
deduplicating, by the device, the data in the particular one of the byte caching modules.

15. The computer program product of claim 14, wherein the statistical classification is a naïve Bayesian classifier.

16. The computer program product of claim 13, further comprising updating, by the device, the table with an indication of the identification of the particular byte caching module associated with the classification of the request.

17. The computer program product of claim 14, further comprising adding, by the device, an entry to the table associating the dynamically classified byte stream with the particular one of the byte caching modules.

18. The computer program product of claim 17, further comprising:
statically allocating a fixed amount of memory, by the device, to accommodate the table in memory;
determining, by the device, that not enough memory remains in the fixed amount of memory to accommodate the entry to be added to the table; and,
responsive to the determination, by the device, evicting an entry in the table to accommodate the entry to be added to the table.

* * * * *